United States Patent [19]

Yishay et al.

[11] Patent Number: 5,664,168
[45] Date of Patent: Sep. 2, 1997

[54] METHOD AND APPARATUS IN A DATA PROCESSING SYSTEM FOR SELECTIVELY INSERTING BUS CYCLE IDLE TIME

[75] Inventors: Oded Yishay; Ann E. Harwood; Chinh H. Le, all of Austin, Tex.

[73] Assignee: Motorola, Inc., Schaumburg, Ill.

[21] Appl. No.: 600,144

[22] Filed: Feb. 12, 1996

Related U.S. Application Data

[63] Continuation of Ser. No. 158,575, Nov. 29, 1993, abandoned.

[51] Int. Cl.$^6$ .......................... G06F 13/10; G06F 13/376
[52] U.S. Cl. .............................. 395/559; 395/856
[58] Field of Search .......................... 395/775, 559, 395/552, 856, 287, 728

[56] References Cited

U.S. PATENT DOCUMENTS

| | | | |
|---|---|---|---|
| 3,737,637 | 6/1973 | Frankeny et al. | 235/153 |
| 4,050,096 | 9/1977 | Bennett et al. | 364/200 |
| 4,788,660 | 11/1988 | Arizono | 364/900 |
| 4,816,996 | 3/1989 | Hill et al. | 364/200 |
| 4,958,277 | 9/1990 | Hill et al. | 364/200 |
| 5,151,986 | 9/1992 | Langan et al. | 395/550 |
| 5,261,073 | 11/1993 | Mann | 395/425 |
| 5,325,491 | 6/1994 | Fasig | 395/325 |
| 5,537,602 | 7/1996 | Kametani | 395/800 |

OTHER PUBLICATIONS

Motorola, Inc., MC68332 User's Manual, Chapter 4: System Integration Module, pp. 4-27 through 4-46., 1990.

*Primary Examiner*—Gopal C. Ray
*Attorney, Agent, or Firm*—Susan C. Hill

[57] ABSTRACT

Method and apparatus in a data processing system (10) for selectively inserting bus cycle idle time. The present invention allows a data processing system (10) to selectively insert a predetermined number of idle clocks at the end of a bus cycle. In one embodiment of the present invention, there is a base register (48) and an option register (46) corresponding to each one of the chip select terminals (73). In one embodiment of the present invention, each option register (46) includes a user programmable idle control bit (110). If a first chip select is used to select a peripheral device during a bus cycle to that same peripheral device, the idle control bit (110) which corresponds to the first chip select determines whether or not one or more idle clocks will be inserted after that bus cycle.

19 Claims, 4 Drawing Sheets

METHOD AND APPARATUS IN A DATA PROCESSING SYSTEM FOR SELECTIVELY INSERTING BUS CYCLE IDLE TIME

This application is a continuation of prior patent application Ser. No. 08/158,575 filed Nov. 29, 1993, abandoned.

REFERENCE TO RELATED APPLICATIONS

The present application is related to the following U.S. patent applications:

"Method And Apparatus For Performing Multiplexed and Non-multiplexed Bus Cycles In A Data Processing System" invented by Oded Yishay et al, Attorney Docket No. SC-02217A, having Ser. No. 08/158,575 filed concurrently herewith, and assigned to the assignee hereof; and "Integrated Circuit Microprocessor With Chip Select Logic", invented by James B. Eifert et al., having Ser. No. 07/432,423, filed Nov. 6, 1989, and assigned to the assignee hereof, which is expressly incorporated by this reference.

FIELD OF THE INVENTION

The present invention relates in general to a data processing system, and more particularly to a method and apparatus in a data processing system for selectively inserting bus cycle idle time.

BACKGROUND OF THE INVENTION

Data processing systems, such as a microcomputer integrated circuit, are used with a wide range of peripheral devices, for example memory integrated circuits and application specific integrated circuits (ASICs). After an external bus access to a peripheral, some peripheral devices respond quickly and discontinue driving the external bus before the next bus cycle begins. Other peripheral devices respond more slowly and may not discontinue driving the external bus before the next bus cycle begins.

For example, if a slow peripheral device is driving the external bus of a data processing system during a first bus cycle, the slow peripheral device may continue to drive the external bus past the end of the first bus cycle and on into the beginning of the next or second bus cycle. Bus contention may result if both the data processing system and the slow peripheral device try to drive the external bus with different values during the beginning of the second bus cycle. Bus contention is especially a problem for data processing systems that use slow peripheral devices with multiplexed address and data bus configurations. However, bus contention may also be a problem for data processing systems that use non-multiplexed busses.

FIG. 5 illustrates an example of how a slow peripheral device may cause bus contention on a multiplexed address/data bus. In FIG. 5, the slow peripheral device continues to drive the first data value on the address/data bus long after the data strobe signal has been negated. Thus the data processing system may start driving the address value for the next bus cycle (i.e. the second address value) on the address/data bus while the slow peripheral device is still driving the first data value. Bus contention may also occur on split transaction busses or pipelined busses when the responses of multiple peripheral devices overlap.

Some existing data processing systems have addressed the problem of bus contention by inserting a fixed number of idle clocks after every access to each peripheral device. Unfortunately, however, this approach wastes a significant amount of time when both slow and fast peripheral devices must be accesses by a data processing system. The slow peripheral devices require the inserted idle clocks in order to prevent bus contention. However, the fast peripheral devices are able to stop driving the external bus quickly enough and thus do not need the inserted idle clocks. Thus the idle clocks inserted after accesses to fast peripheral devices are not necessary and waste valuable bus time.

SUMMARY OF THE INVENTION

The previously mentioned needs are fulfilled and other advantages achieved with the present invention. In one form, the present invention is a method for avoiding bus contention during bus cycles in a data processing system. The method includes the step of initiating a bus cycle in response to receiving a plurality of address signals. If a first control value has a first logic state, the method includes the step of completing the bus cycle and then inserting a first predetermined delay. If the first control value has a second logic state, the method includes the step of completing the bus cycle and then inserting a second predetermined delay.

In an alternate form, the present invention is a data processing system having a processor, a plurality of bus terminals, a first control register portion, and a control circuit. The first control register portion stores a first control value. The first control register portion selects a delay mode if the first control value has a first mode value, and selects a non-delay mode if the first control value has a second mode value. The first control register portion is coupled to the processor. The control circuit receives the first control value. If the first control value is the first mode value, the control circuit completes a first bus cycle and then inserts a first predetermined delay. If the first control value is the second mode value, the control circuit completes the first bus cycle and inhibits insertion of the first predetermined delay. The control circuit is coupled to the plurality of bus terminals and to the first control register portion.

The present invention will be understood by one skilled in the art from the detailed description below in conjunction with the accompanying drawings.

DESCRIPTION OF THE PREFERRED EMBODIMENT

Figure 1:
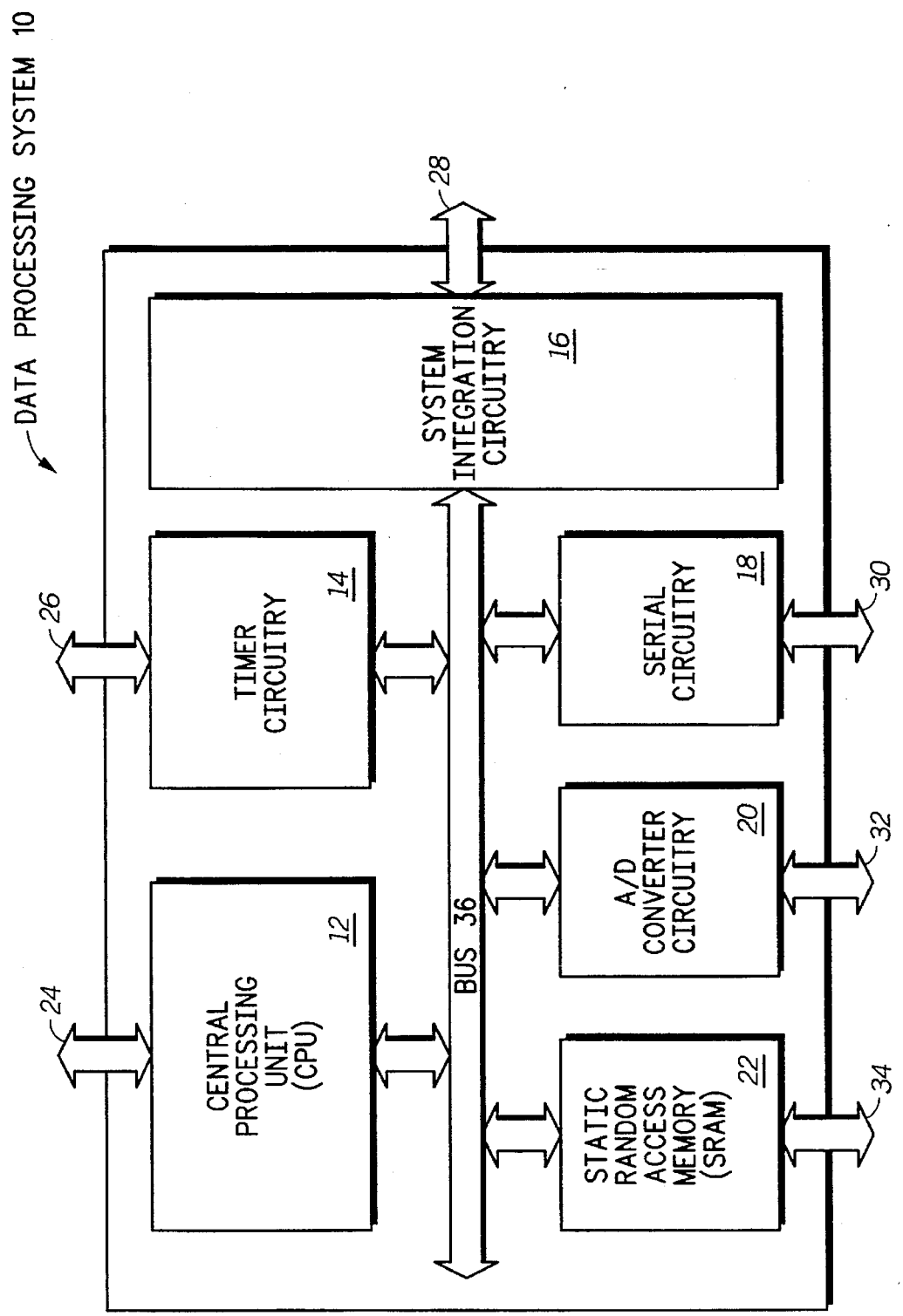
FIG. 1 illustrates, in block diagram form, a data processing system 10 in accordance with one embodiment of the present invention.

The present invention allows a data processing system 10 to selectively insert one or more idle clocks at the end of a bus cycle. Thus a data processing system 10 can avoid bus contention by selectively inserting a predetermined number of idle clocks at the end of a bus cycle accessing a slow peripheral device. In addition, the data processing system 10 may select not to insert any idle clocks at the end of a bus cycle accessing a fast peripheral device. In this manner, bus contention is avoided without wasting valuable bus time performing the necessary idle clocks. Thus using the present invention, idle clocks may be inserted only at the end of bus cycles accessing slow peripherals, and not at the end of all bus cycles.

In one embodiment of the present invention, there is a base register 48 and an option register 46 corresponding to each one of the chip select terminals 73. Each option register 46 has one or more bit fields which are user programmable. In one embodiment of the present invention, each option register 46 includes an idle control bit 110. If a first chip select is used to select a peripheral device during a bus cycle to that same peripheral device, the idle control bit 110 which corresponds to the first chip select determines whether or not one or more idle clocks will be inserted after that bus cycle.

Figure 6:
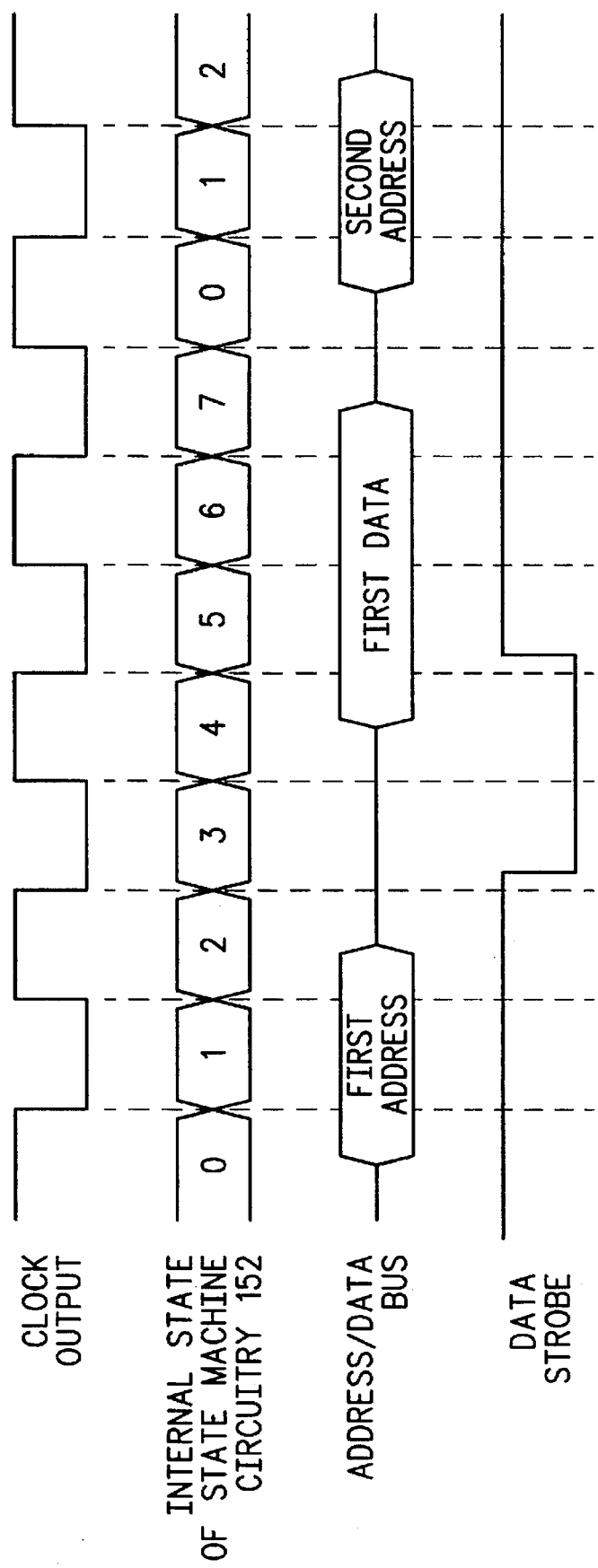
FIG. 6 illustrates, in timing diagram form, an example of how bus contention can be avoided on a multiplexed address/data bus in accordance with one embodiment of the present invention.

The term "idle time" or "idle clock(s)", as used in this document, is an extra period of time added to the end of a bus cycle. When the idle clock or clocks at the end of a first bus cycle have completed, the next or second bus cycle can begin. FIG. 6 illustrates an example of how an idle clock can be inserted at the end of a bus cycle accessing a slow peripheral device in order to ensure that bus contention does not occur on a multiplexed address/data bus. The idle clock is added at the end of the first bus cycle and occurs during internal states 6 and 7 of the state machine circuitry 152. The second bus cycle does not start until the internal state of state machine circuitry 152 returns to state 0. Thus the idle clock allows the slow peripheral device driving the first data value to stop driving the address/data bus before the second address is driven by data processing system 10.

The purpose served by adding idle time at the end of a bus cycle is significantly different than the purpose served by adding wait states in the middle of a bus cycle. The purpose of wait states is to increase the time period between the address value being valid and the data value being valid on the bus. Some peripherals require a significant time interval between receiving an address value and responding with a data value. The data processing system must wait an extra amount of time (i.e. for one or more wait states) after providing the address value and before determining the data value from the bus. If the data processing system does not wait long enough, the peripheral may not have had a sufficient amount of time to drive the bus with the data value, and the data processing system may read an incorrect data value.

Thus the purpose served by wait states is not to prevent bus contention, but to prevent the data processing system from receiving incorrect data. And unlike idle clocks, which are only inserted at the end of a bus cycle, wait states are inserted in the middle of a bus cycle between the transfer of the address value and the transfer of the data value.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The present invention can be more fully understood with reference to FIGS. 1–6. FIG. 1 illustrates a data processing system 10 that includes a central processing unit (CPU) 12, timer circuitry 14, system integration circuitry 16, serial circuitry 18, A/D converter circuitry 20, and static random access memory (SRAM) 22, which are all bi-directionally coupled to bus 36. CPU 12 is optionally coupled external to data processing system 10 by way of integrated circuit terminals 24. Timer 14 is coupled external to data processing system 10 by way of integrated circuit terminals 26.

System integration circuitry 16 is coupled external to data processing system 10 by way of integrated circuit terminals 28. Serial circuitry 18 is coupled external to data processing system 10 by way of integrated circuit terminals 30. A/D converter circuitry 20 is coupled external to data processing system 10 by way of integrated circuit terminals 32. SRAM 22 is optionally coupled external to data processing system 10 by way of one or more integrated circuit terminals 34. In one embodiment, data processing system 10 is a microcomputer formed on a single integrated circuit. In one embodiment of the present invention, integrated circuit terminals 24, 26, 28, 30, 32, and 34 are integrated circuit bonding pads. In another embodiment of the present invention, integrated circuit terminals 24, 26, 28, 30, 32, and 34 are integrated circuit pins.

Figure 2:
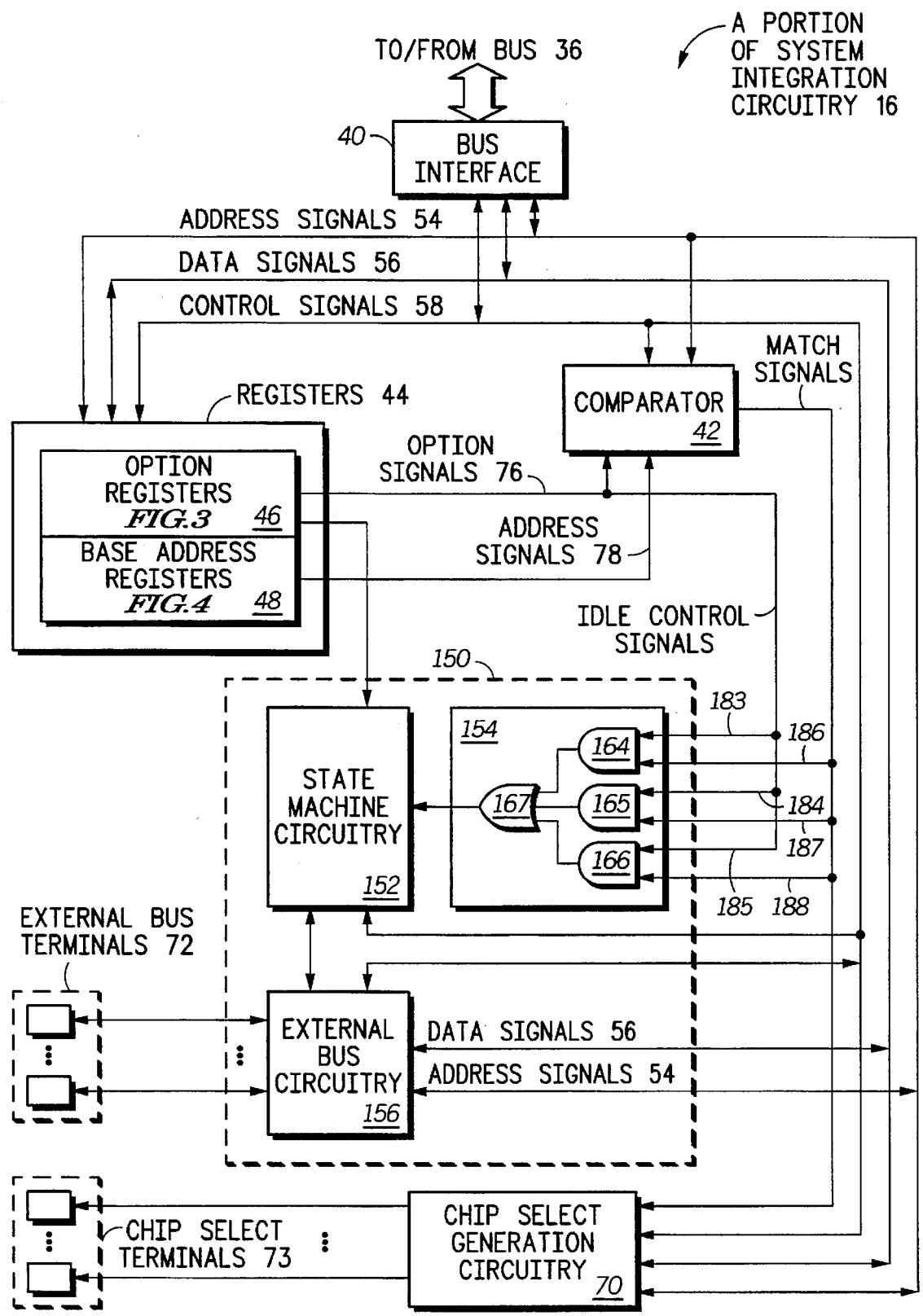
FIG. 2 illustrates, in partial block diagram form and partial schematic diagram form, a portion of system integration circuitry 16 of FIG. 1 in accordance with one embodiment of the present invention.

FIG. 2 illustrates one embodiment of a portion of system integration circuitry 16. The illustrated portion of system integration circuitry 16 includes bus interface circuitry 40 which is bi-directionally coupled to bus 36. Address signal conductors 54 are coupled to bus interface 40, comparator circuitry 42, registers 44, external bus circuitry 156, and chip select generation circuitry 70. Data signal conductors 56 are coupled to bus interface 40, registers 44, external bus circuitry 156, and chip select generation circuitry 70. Control signal conductors 58 are coupled to bus interface 40, comparator 42, registers 44, state machine circuitry 152, external bus circuitry 156, and chip select generation circuitry 70.

Figure 3:
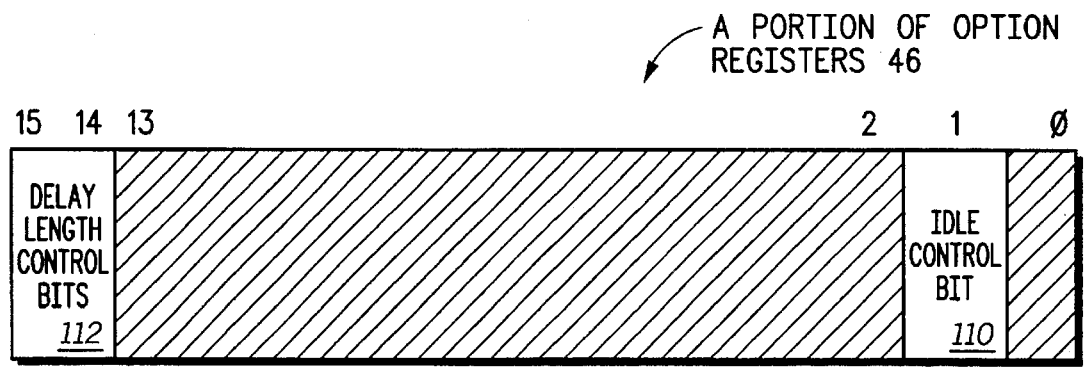
FIG. 3 illustrates, in block diagram form, a portion of option registers 46 of FIG. 2 in accordance with one embodiment of the present invention.
Figure 4:
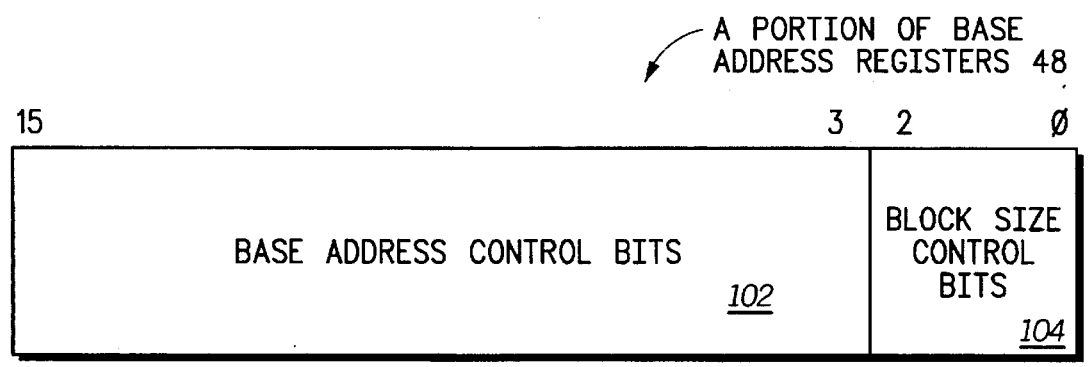
FIG. 4 illustrates, in block diagram form, a portion of base address registers 48 of FIG. 2 in accordance with one embodiment of the present invention.

Registers 44 include option registers 46 (see FIG. 3) and base address registers 48 (see FIG. 4). A first one of option registers 46 provides an idle control bit 110 (see FIG. 3) to a first input of AND-gate 164 by way of conductor 183. A second one of option register 46 provides an idle control bit 110 (see FIG. 3) to a first input of AND-gate 165 by way of conductor 184. And, a third one of option registers 46 provides an idle control bit 110 (see FIG. 3) to a first input of AND-gate 166 by way of conductor 185. Note that in one embodiment of the present invention, these idle control signals are part of option signals 76.

Comparator 42 is coupled to option registers 46 by way of option signal conductors 76. Comparator 42 is coupled to base address registers 48 by way of address signal conductors 78. Comparator 42 provides a plurality of match signals to circuit 154 and to chip select generation circuitry 70. Comparator 42 provides a first match signal to a second input of AND-gate 164 by way of conductor 186. Comparator 42 provides a second match signal to a second input of AND-gate 165 by way of conductor 187. And, comparator 42 provides a third match signal to a second input of AND-gate 166 by way of conductor 188. The output of AND-gate 164 is coupled to a first input of OR-gate 167. The output of AND-gate 165 is coupled to a second input of OR-gate 167. And, the output of AND-gate 166 is coupled to a third input of OR-gate 167.

The output of OR-gate 167 is coupled to state machine circuitry 152. State machine circuitry 152 and external bus circuitry 156 are bi-directionally coupled to each other. A circuit 154 includes AND-gates 164-166 and OR-gate 167. A circuit 150 includes state machine circuitry 152, external bus circuitry 156, and circuit 154.

External bus circuitry 156 is bi-directionally coupled to a plurality of external bus terminals 72. Chip select generation circuitry 70 is coupled to a plurality of chip select terminals 73. In one embodiment of the present invention, integrated circuit terminals 28 of FIG. 1 include external bus terminals 72 and chip select terminals 73.

FIG. 3 illustrates one possible embodiment of a portion of option registers 46 of FIG. 2. In one embodiment of the present invention, there is an identical option register for each of the chip select terminals 73. FIG. 3 registers one of the plurality of option registers 46. Each of the option registers 46 has a control register portion for selectively inserting idle clocks. In one embodiment of the present invention, this control register portion for selectively inserting idle clocks is an idle control bit 110.

In one embodiment of the present invention, each of the option registers 46 has a control register portion for determining the length of idle time which may be selectively inserted at the end of certain bus cycles. In one embodiment of the present invention, this control register portion for selectively inserting idle clocks includes one or more delay length control bits 112. In some embodiments of the present invention, there is one set of delay length control bits 112 for each chip select terminal 73. In yet other embodiments, the functionality of the delay length control bits 112 may be encoded into fewer or more bits, or may be combined with other functions and may be encoded into more bits.

In one embodiment of the present invention, the delay length control bits 112 determine the number of internal states of state machine circuitry 152 which are inserted as idle states at the end of a bus cycle. For this embodiment, option registers 46 are coupled to state machine circuitry 152.

In alternate embodiments of the present invention, each option register in option registers 46 may include other control bits (not shown). For example, in alternate embodiments of the present invention, each option register in option registers 46 may include other control bits (not shown) which are provided to comparator 42 and which are used to determine the behavior of the corresponding chip select signal.

Also, in alternate embodiments of the present invention, there may be any number of bits in the idle control bit field 110 in each one of the option registers 46. In some embodiments of the present invention, there is one idle control bit 110 for each chip select terminal 73. In yet other embodiments, the functionality of the idle control bit 110 may be encoded into more bits, or may be combined with other functions and may be encoded into more bits. Note that if the functionality of idle control bit 110 is encoded, a decoder (not shown) may be required between option registers 46 and circuit 154 and between option registers 46 and comparator 42 in order to properly decode the encoded control bits. Alternately, the circuitry in circuit 154 and comparator 42 may be modified so that no decoding is required.

In one embodiment of the present invention, if idle control bit 110 is a logic level one, a predetermined number of idle clocks are added at the end of each of the bus cycles which use the corresponding chip select signal. However, if idle control bit 110 is a logic level zero, no idle clocks are added at the end of each of the bus cycles which use the corresponding chip select signal. Note again that each of chip select terminals 73 (i.e. each chip select signal) has a corresponding option register in option registers 46, and thus has a corresponding idle control bit 110.

FIG. 4 illustrates one possible embodiment of a portion of base address registers 48 of FIG. 2. In one embodiment of the present invention, there is a base address register for each of the chip select terminals 73. FIG. 4 illustrates one of the plurality of base address registers 48. Each of the base address registers 48 has a plurality of base address control bits 102 and a plurality of block size control bits 104.

In one embodiment of the present invention, a user of data processing system 10 programs base address control bits 102 and block size control bits 104 in one of the base address registers 48 in order to select a block of memory (i.e. an address range) for a corresponding one of the chip select terminals 73. Because each of the chip select terminals 73 has a corresponding base address register, each chip select terminal 73 may be programmed to be asserted for a different address range. The base address control bits 102 and the block size control bits 104 are transferred to comparator 42 by way of address signals 78.

In alternate embodiments of the present invention, base address registers 48 may include other control bits (not shown). For example, in alternate embodiments of the present invention, base address registers 48 may include other control bits (not shown) which are used to affect the behavior of system integration circuitry 16.

Also, in alternate embodiments of the present invention, there may be any number of base address control bits 102 and any number of block size control bits 104. In addition, in alternate embodiments of the present invention, the functionality of the base address control bits 102 and the functionality of the block size control bits 104 may be encoded in a variety of ways using more or fewer bits. Alternately, the functionality of the base address control bits 102 and the functionality of the block size control bits 104 may be combined with other functions and may be encoded into more or fewer bits. Note that if the functionality of the base address control bits 102 and the functionality of the block size control bits 104 are encoded, a decoder (not shown) may be required between base address registers 48 and comparator 42 in order to properly decode the encoded control bits. Alternately, the circuitry in comparator 42 may be modified so that no decoding is required.

A detailed description of the use of base address registers and option registers for chip selects is described in a related, copending application entitled "Integrated Circuit Microprocessor With Chip Select Logic", invented by James B. Eifert et al., filed Nov. 6, 1989, which has been expressly incorporated herein above.

Figure 5:
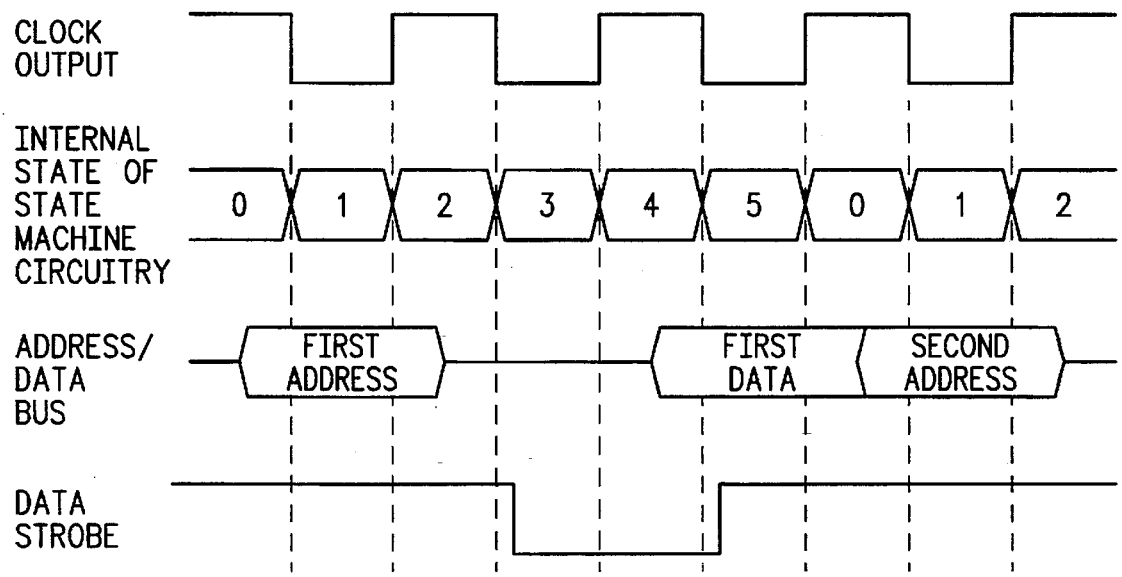
FIG. 5 illustrates, in timing diagram form, an example of how a slow peripheral device may cause bus contention on a multiplexed address/data bus.

FIG. 5 illustrates an example of how a slow peripheral device may cause bus contention on a multiplexed address/data bus if the present invention is not used. In FIG. 5, the slow peripheral device continues to drive the first data value on the address/data bus long after the data strobe signal has been negated. Thus the data processing system may start driving the address value for the next bus cycle (i.e. the second address value) on the address/data bus while the slow peripheral device is still driving the first data value.

Still referring to FIG. 5, the logic state of the address/data bus is available on a first portion of the external bus terminals. Either a data processing system or a peripheral device may drive the address/data bus. Although it is not illustrated in FIG. 5, the data processing system may assert a first chip select signal on one of the chip select terminals at the beginning of the first bus cycle. The peripheral device which receives the asserted chip select signal responds to the data processing system by driving a first data value on the address/data bus. The state machine circuitry which controls the address/data bus sequentially progresses through internal states 0 through 5.

The external bus circuitry provides a data strobe signal on an external bus terminal. The state machine circuitry asserts the data strobe signal during internal state 3 and negates the data strobe signal during the last internal state of the bus cycle (i.e. state 5). Once internal state 5 has been completed, the state machine circuitry automatically initiates the next external bus cycle by returning to state 0. Unfortunately, however, if the peripheral device which is driving the first data value is too slow, that peripheral device may continue to drive the first data value on the address/data bus while the state machine circuitry transitions to state 0 and begins a new bus cycle. Thus bus contention may occur because the data processing system is driving the address/data bus with a second address value for a second bus cycle when the slow peripheral device is still driving the first data value from the previous bus cycle.

FIG. 6 illustrates an example of how the present invention can selectively insert idle clocks at the end of a bus cycle in order to ensure that bus contention does not occur on a multiplexed address/data bus. In the timing diagram in FIG. 6, one idle clock is added at the end of the first bus cycle and occurs during internal states 6 and 7 of state machine circuitry 152. The second bus cycle does not start until the internal state of state machine circuitry 152 returns to state 0. Thus the idle clock allows the slow peripheral device driving the first data value to stop driving the address/data bus before the second address is driven by data processing system 10.

In FIG. 6, the slow peripheral device continues to drive the first data value on the address/data bus long after the data strobe signal has been negated. However, the insertion of the idle clock ensures that data processing system 10 does not start to drive the address value for the next bus cycle (i.e. the second address value) on the address/data bus while the slow peripheral device is still driving the first data value.

Still referring to FIG. 6, the logic state of the address/data bus is available on a first portion of the external bus terminals 72. Either data processing system 10 or a peripheral device (not shown) may drive the address/data bus. Although it is not illustrated in FIG. 6, data processing system 10 may assert a first chip select signal on one of the chip select terminals 73 at the beginning of the first bus cycle. The peripheral device (not shown) which receives the asserted chip select signal responds to data processing system 10 by driving a first data value on the address/data bus. The state machine circuitry 152 which controls the address/data bus sequentially progresses through internal states 0 through 5, and then inserts an idle clock during internal states 6 and 7.

The external bus circuitry 156 provides a data strobe signal on an external bus terminal 72. The state machine circuitry 152 asserts the data strobe signal during internal state 3 and negates the data strobe signal during internal state 5. Once internal state 5 has been completed, the state machine circuitry 152 selectively inserts an idle clock by adding internal states 6 and 7. After the idle clock has completed, (i.e. after internal state 7 has completed), state machine circuitry 152 initiates the next external bus cycle by returning to state 0. The extra time provided by the insertion of the idle clock on the address/data bus ensures that the peripheral device driving the first data value has sufficient time to stop driving the address/data bus before the second address is driven by data processing system 10.

Note that the peripheral device (not shown) responsible for driving the first data value on the address/data bus in both FIG. 5 and FIG. 6 may be the same slow peripheral device. Thus the amount of time required for the slow peripheral device to stop driving the first data value after the negation of the data strobe signal may be the same in the two figures. However, FIG. 5 illustrates the bus contention which may result if the present invention is not used. And FIG. 6 illustrates how the use of the present invention to insert an idle clock on the address/data bus may eliminate the problem of bus contention.

The operation of the present invention will now be discussed. The present invention allows a data processing system 10 to selectively insert one or more idle clocks at the end of a bus cycle. Thus a data processing system 10 can avoid bus contention by selectively inserting a predetermined number of idle clocks at the end of a bus cycle accessing a slow peripheral device. In addition, the data processing system 10 may select not to insert any idle clocks at the end of a bus cycle accessing a fast peripheral device. In this manner, bus contention is avoided without wasting valuable bus time performing unnecessary idle clocks. Thus using the present invention, idle clocks may be inserted only at the end of bus cycles accessing slow peripherals, and not at the end of all bus cycles.

In one embodiment of the present invention, CPU 12 can initiate read accesses and write accesses to registers 44. Registers 44 are read and write accessible by way of bus 36, bus interface 40, address signals 54, data signals 56, and control signals 58. A user of data processing system 10 is able to program option registers 46 by writing a value to option registers 46, and is able to program base address registers 48 by writing a value to base address registers 48.

In one embodiment of the present invention, CPU 12 is able to initiate external bus cycles which use external bus terminals 72 to transfer information to and/or from external devices (not shown) which are external to data processing system 10. For example, to initiate an external write bus cycle, CPU 12 transfers address, data, and control signals to system integration circuitry 16 by way of bus 36. In alternate embodiments of the present invention, other portions of circuitry in data processing system 10 (not shown) may initiate external bus cycles.

In one embodiment of the present invention, bus interface 40 provides the address signals from bus 36 to address signal conductors 54, transfers the data signals between bus 36 and data signals 56, and transfers the control signals between bus 36 and control signal conductors 58. Comparator 42 then performs a compare operation to compare predetermined ones of option signals 76 and predetermined ones of control signals 58. The logic states of option signals 76 are determined by the logic states of one or more predetermined control bits in option registers 46. In addition, comparator 42 also performs a compare operation to compare predetermined ones of address signals 78 and predetermined ones of address signals 54. The logic states of address signals 78 are determined by the logic states of one or more predetermined control bits in base address registers 48.

In one embodiment of the present invention, each chip select terminal 73 has a corresponding base address register in base address registers 48 (see FIG. 2 and FIG. 5). Likewise, each chip select terminal 73 has a corresponding option register in option registers 46 (see FIG. 2). In one embodiment of the present invention, chip select terminals 73 include three chip select terminals. As a result, there are three option registers 46 and three base address registers 48. One option register 46 and base register 48 pair is associated with each one of the chip select terminals 73. Alternate embodiments of the present invention may include any number of chip select terminals 73, or no chip select terminals 73.

As an example, if the address signals 78 and the option signals 76 match for a first chip select, then the corresponding match signal, namely the match signal transferred on conductor 186, is asserted. Likewise, if the address signals 78 and the option signals 76 match for a second chip select, then the corresponding match signal, namely the match signal transferred on conductor 187, is asserted. Likewise, if the address signals 78 and the option signals 76 match for a third chip select, then the corresponding match signal, namely the match signal transferred on conductor 188, is asserted. In alternate embodiments of the present invention, only the address signals 78 may be compared in order assert a match signal, or only the option signals 76 may be compared in order assert a match signal.

Other control bits (not shown) in option registers 48 may be used to affect the response of system integration circuitry 16 in the event of an address and option match. For example, these other control bits (not shown) may be used to determine the required data transfer size, the required function codes, or the required timing associated with the assertion of a chip select signal on chip select terminals 73.

In alternate embodiments of the present invention, there may be additional registers in registers 44. Also, in alternate embodiments, the bit fields in registers 44 may have fewer or more bits. In addition, in alternate embodiments, the bits fields in registers 44 may be located in different registers or may be located in a different portion of the same register.

In one embodiment of the present invention, three chip select signals are provided at the chip select terminals 73 by chip select generation circuitry 70. Each chip select signal has a corresponding one of the option registers 46, and thus has a corresponding idle control bit 110. The idle control bit 110 for each chip select signal determines whether or not a predetermined number of idle clocks will be inserted at the end of a bus cycle in which the corresponding chip select signal was asserted.

As an example, a slow peripheral device (not shown) can be coupled to a first chip select terminal 73 for receiving a first chip select signal. When comparator 42 determines that a match has occurred, comparator 42 asserts the match signal provided to the second input of AND-gate 164 and to the chip select generation circuitry 70. As a result, chip select generation circuitry 70 asserts the first chip select signal on the first chip select terminal 73. The idle control bit 110 which corresponds to the first chip select signal is provided to the first input of AND-gate 164. If the idle bit 110 is asserted, the output of AND-gate 164 is asserted. If the output of AND-gate 164 is asserted, then the output of OR-gate 167 is asserted. If the output of OR-gate 167 is asserted, state machine circuitry 152 will insert one or more idle clocks at the end of the bus cycle in which the first chip select signal is asserted.

However, if the idle bit 110 is negated and no other match signal are asserted, the output of AND-gates 164–166 are negated. If the outputs of AND-gates 164–166 are negated, then the output of OR-gate 167 is negated. If the output of OR-gate 167 is negated, state machine circuitry 152 will not insert idle clocks at the end of the bus cycle in which the first chip select signal is asserted.

In one embodiment of the present invention, the number of idle clocks which can be selectively inserted at the end of a bus cycle is a predetermined constant. For example, in FIG. 6 one idle clock is inserted during internal state 6 and 7 of state machine 152. In one embodiment of the present invention, the period of one idle clock is measured by the period of a clock output signal. The clock output signal illustrated in FIG. 6 is a clock signal internal to state machine circuitry 152 which is synchronous with the internal state changes in state machine circuitry 152. Thus FIG. 6 illustrates an embodiment of the present invention in which one idle clock is inserted at the end of the first bus cycle. Note that in alternate embodiments of the present invention, the clock output signal illustrated in FIG. 6 may be provided as an output signal at one of the external bus terminals 72.

In an alternate embodiment of the present invention, the period of idle time at the end of a bus cycle may be based on signals other than the clock output signal. For example, the period of idle time may be based on a real time clock signal. In some embodiments of the present invention, the length of idle time for each chip select signal may be user programmable. For example, each one of option registers 46 may include one or more delay length control bits 112 which determine the length of idle time for the corresponding chip select. Alternately, there may be one idle length register bit field for all of the chip selects. In this case, the idle time is programmable, but will be the same for all chip selects.

In one embodiment of the present invention, the idle time selectively added at the end of a bus cycle is fixed at one idle clock, which is equivalent to one clock output signal period (see FIG. 6). In this embodiment of the present invention, one idle clock corresponds to two internal states in state machine circuitry 152. Alternate embodiments may insert any length of idle time at the end of a bus cycle. Alternate embodiments may insert the same or different amounts of idle time for each bus cycle affected.

In the embodiment of the present invention illustrated in FIG. 2, circuit 150 is used to control the transfer of address signals 54, data signals 56, and control signals 58 onto external bus terminals 72. The timing of these signal transfers is controlled by state machine circuitry 152. Conductors 183, 184, and 185, which reflect the values of the idle control bits 110 for each of the three option registers 46, respectively, are inputs to circuitry 150. The match signals provided by comparator 42 are also inputs to circuitry 150 by way of conductors 186, 187, and 188.

Still referring to the embodiment of the present invention illustrated in FIG. 2, the output of OR-gate 167 in circuit 154 is provided as an input to state machine circuitry 152. State machine circuitry 152 controls the actual insertion or non-insertion of idle clocks at the end of a bus cycle initiated by CPU 12. If one of the match signals from comparator 42 is asserted, and the corresponding idle control bit 110 is also asserted, then the output of circuit 154 will cause state machine circuitry 152 to insert additional states following the completion of the bus cycle. For example, if conductors 183 and 186 are asserted or conductors 184 and 187 are asserted, or conductors 185 and 188 are asserted, one or more idle clocks will be inserted by state machine circuitry 152.

While the present invention has been illustrated and described with reference to specific embodiments, further modifications and improvements will occur to those skilled in the art. For example, in alternate embodiments of the present invention, data processing system 10 may be any type of data processing system which includes external bus terminals 72 and which provides for the selective insertion of one or more idle clocks at the end of a bus cycle. In one embodiment, data processing system 10 may be a microcomputer integrated circuit. In alternate embodiments of the present invention, data processing system 10 may have different blocks of circuitry than those illustrated in FIG. 1. In addition, in alternate embodiments of the present invention, external bus terminals 72 may not be included as part of system integration circuitry 16, but may be located anywhere in data processing system 10.

In alternate embodiments of the present invention, the logic gates in circuit 154 may be replaced with different circuit elements. In the simplest form, the present invention may have one control bit for each chip select which determines whether a predetermined number of idle clocks will be inserted at the end of bus accesses using the corresponding chip select. In more complex embodiments of the present invention, other control bits may be used as well.

Alternate embodiments of the present invention may be used with a wide variety of bus types, including fixed transaction, split transaction, pipelined, non-pipelined, multiplexed, and non-multiplexed, as well as other bus types.

Note that in alternate embodiments of the present invention, chip select generation circuitry 70 and chip select terminals 73 may not be implemented. As a result, idle clocks may be inserted after selected bus cycles, but no corresponding chip select signal is asserted. Alternately, chip select generation circuitry 70 may generate chip select signals; however, chip select terminals 73 may not be implemented or may be used for a function other than transferring chip select signals external to data processing system 10.

Note that if no match signal is asserted by comparator 42 and a bus cycle is initiated, some embodiments of the present invention default to inserting a predetermined number of idle clocks at the end of the bus cycle. However, in alternate embodiments of the present invention, the default may be user programmable, or may be no insertion of idle clocks.

It is to be understood, therefore, that this invention is not limited to the particular forms illustrated and that the appended claims cover all modifications that do not depart from the spirit and scope of this invention.

We claim:

1. A method for avoiding bus contention during bus cycles in a data processing system, the method comprising the steps of:

initiating a bus cycle in response to receiving a plurality of address signals;

providing a first control value corresponding to a first chip select signal;

determining if the plurality of address signals are within a first address range corresponding to the first chip select signal;

if the plurality of address signals are within the first address range corresponding to the first chip select signal, and the first control value has a first value, completing the bus cycle and then inserting a first bus cycle idle time; and if the plurality of address signals are within the first address range corresponding to the first chip select signal, and the first control value has a second value, completing the bus cycle and then inserting a second bus cycle idle time wherein the first bus cycle idle time is different than the second bus cycle idle time.

2. The method as in claim 1, wherein the first bus cycle idle time is zero seconds.

3. The method as in claim 1, further comprising the step of:

writing the first control value to a first control register portion.

4. The method as in claim 1, further comprising the step of:

writing a bus cycle idle time value to a second control register portion, the bus cycle idle time value determining the first bus cycle idle time.

5. The method as in claim 1, further comprising the step of:

asserting the first chip select signal during the bus cycle.

6. A method as in claim 1, further comprising the steps of:

providing a second control value corresponding to a second chip select signal;

determining if the plurality of address signals are within a second address range corresponding to the second chip select signal;

if the plurality of address signals are within the second address range correspond to the second chip select signal, and the second control value has said first value, completing the bus cycle and then inserting said first bus cycle idle time; and if the plurality of address signals are within the second address range correspond to the second chip select signal, and the second control value has said second value, completing the bus cycle and then inserting said second bus cycle idle time.

7. A data processing system, comprising:

a processor;

a plurality of bus terminals;

a first control register portion for storing a first control value, said first control register portion selecting a bus cycle idle mode if the first control value has a first mode value and selecting a non-bus cycle idle mode if the first control value has a second mode value, said first control register portion being coupled to said processor;

a compare circuit for determining if a plurality of address signals is within a first predetermined address range, said compare circuit providing a comparison result value; and control means for receiving the first control value and for receiving the comparison result value, if the first control value is the first mode value and the comparison result value indicates that the plurality of address signals is within the first predetermined address range, said control means completing a first bus cycle and then inserting a bus cycle idle time, and if the first control value is the second mode value and the comparison result value indicates that the plurality of address signals is within the first predetermined address range, said control means completing the first bus cycle and inhibiting insertion of the bus cycle idle time, said control means being coupled to said plurality of bus terminals, to said compare circuit, and to said first control register portion.

8. A data processing system as in claim 7, further comprising:

a second control register portion for storing a second control value, said second control register portion selecting the bus cycle idle mode if the second control value has the first mode value and selecting the non-bus cycle idle mode if the control value has the second mode value, said second control register portion being coupled to said processor.

9. A data processing system as in claim 7, further comprising:

an address bus, coupled to said plurality of bus terminals; and a data bus, coupled to said plurality of bus terminals.

10. A data processing system as in claim 9, further comprising:

a third control register portion for storing a bus cycle idle time value, the bus cycle idle time value determining a duration of the bus cycle idle time.

11. A data processing system as in claim 10, further comprising:

chip select generation circuitry, coupled to said compare circuit.

12. A data processing system as in claim 11, further comprising:

a chip select terminal, coupled to said chip select generation circuitry.

13. A data processing system as in claim 12, wherein said chip select generation circuitry receives the match signal from said compare circuit and in response provides a chip select signal to said chip select terminal.

14. A method for performing bus cycles in a data processing system, the method comprising the steps of:

providing first chip select circuitry, the first chip select circuitry corresponding to a first address range;

providing second chip select circuitry, the second chip select circuitry corresponding to a second address range;

storing a first control value in a first control register portion, the first control register portion corresponding to the first address range;

storing a second control value in a second control register portion, the second control register portion corresponding to the second address range;

initiating a first bus cycle in response to receiving a first plurality of address signals, the first plurality of address signals corresponding to the first address range;

if the first control value has a first value, completing the first bus cycle and then inserting a first bus cycle idle time;

if the first control value has a second value, completing the first bus cycle and inhibiting insertion of the first bus cycle idle time;

initiating a second bus cycle in response to receiving a second plurality of address signals, the second plurality of address signals corresponding to the second address range;

if the second control value has the first value, completing the second bus cycle and then inserting a second bus cycle idle time; and if the second control value has the second value, completing the second bus cycle and inhibiting insertion of the second bus cycle idle time wherein the first bus cycle idle time is different than the second bus cycle idle time.

15. The method as in claim 14, further comprising the steps of:

selecting the duration of the first bus cycle idle time; and selecting the duration of the second bus cycle idle time.

16. The method as in claim 15, wherein said step of selecting the duration of the first bus cycle idle time comprises the step of:

storing a first bus cycle idle time value in a third control register portion; and wherein said step of selecting the duration of the second bus cycle idle time comprises the step of:

storing a second bus cycle idle time value in a fourth control register portion.

17. The method as in claim 14, further comprising the steps of:

asserting a first chip select signal during the first bus cycle; and asserting a second chip select signal during the second bus cycle.

18. A method as in claim 14, further comprising the steps of:

comparing at least a portion of the first plurality of address signals to at least a portion of a first base address value; and comparing at least a portion of the second plurality of address signals to at least a portion of a second base address value.

19. The method as in claim 14, wherein the first bus cycle idle time is zero seconds.

* * * * *